United States Patent
Shen

(10) Patent No.: US 9,529,396 B2
(45) Date of Patent: Dec. 27, 2016

(54) HEAT DISSIPATION STRUCTURE OF INTELLIGENT WEARABLE DEVICE

(71) Applicant: Asia Vital Components Co., Ltd., New Taipei (TW)

(72) Inventor: Ching-Hang Shen, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 52 days.

(21) Appl. No.: 14/555,708

(22) Filed: Nov. 28, 2014

(65) Prior Publication Data

US 2016/0154442 A1    Jun. 2, 2016

(51) Int. Cl.
*H05K 7/20* (2006.01)
*G06F 1/20* (2006.01)
*G06F 1/16* (2006.01)
*H01L 23/473* (2006.01)

(52) U.S. Cl.
CPC .............. *G06F 1/203* (2013.01); *G06F 1/163* (2013.01)

(58) Field of Classification Search
CPC . G06F 1/181–1/182; H05K 7/20218–7/20381; H05K 7/20409–7/20418; H05K 7/20009–7/202; H01L 23/367–23/3677; H01L 23/473; H01L 23/46–23/467
USPC .......................... 361/676–678, 679.46–679.54, 688–723,361/756, 741, 686, 687, 725, 787, 789, 794,361/807–810; 165/80.1–80.5, 104.33, 185; 174/15.1–15.3, 16.1–16.3, 547, 548; 257/712–722, E23.088; 24/453, 458–459; 454/184; 312/236
See application file for complete search history.

(56) References Cited

U.S. PATENT DOCUMENTS

| | | | | |
|---|---|---|---|---|
| 5,305,181 A | * | 4/1994 | Schultz | B60R 11/02 345/168 |
| 6,137,675 A | * | 10/2000 | Perkins | G06F 1/163 128/876 |
| 6,262,889 B1 | * | 7/2001 | Newman | G06F 1/163 361/679.54 |
| 6,282,089 B1 | * | 8/2001 | Nakanishi | G06F 1/163 361/679.47 |
| 6,529,372 B1 | * | 3/2003 | Ng | G06F 1/163 312/223.2 |
| 9,081,542 B2 | * | 7/2015 | Dickinson | G06F 3/0412 |

(Continued)

FOREIGN PATENT DOCUMENTS

| | | |
|---|---|---|
| EP | 2763000 A2 | 8/2014 |
| TW | 200919210 A | 5/2009 |
| TW | 473711 U | 3/2014 |

*Primary Examiner* — Anthony Haughton
*Assistant Examiner* — Razmeen Gafur
(74) *Attorney, Agent, or Firm* — C. G. Mersereau; Nikolai & Mersereau, P.A.

(57) ABSTRACT

A heat dissipation structure of intelligent wearable device includes a wearable mobile device main body and a hard wearable body. The wearable mobile device main body has a receiving space for receiving therein multiple electronic components. The electronic components have at least one heat source. The hard wearable body is made of thermosetting polymer material or thermoplastic polymer material. The hard wearable body has a chamber having a capillary structure. A working fluid is contained in the chamber. The hard wearable body has a heat absorption section and a heat dissipation section. The hard wearable body is connected with the wearable mobile device main body. The heat absorption section is in contact with the electronic components or the heat source to conduct heat to the heat dissipation section to dissipate the heat at a remote end. Accordingly, the heat dissipation efficiency of the intelligent wearable device is greatly enhanced.

7 Claims, 7 Drawing Sheets

(56) References Cited

U.S. PATENT DOCUMENTS

| | | | | |
|---|---|---|---|---|
| 2002/0024512 A1* | 2/2002 | Terasawa | G06F 1/163 | 345/204 |
| 2002/0105778 A1* | 8/2002 | Harada | G06F 1/1601 | 361/679.03 |
| 2002/0186535 A1* | 12/2002 | Smith | D03D 15/00 | 361/704 |
| 2003/0213822 A1* | 11/2003 | Lautner | A44C 5/0007 | 224/221 |
| 2005/0024831 A1* | 2/2005 | Phillips | F28D 15/025 | 361/700 |
| 2006/0226973 A1* | 10/2006 | Catlin | G08B 17/10 | 340/539.11 |
| 2008/0005875 A1* | 1/2008 | Friedman | H04B 1/385 | 24/578.15 |
| 2008/0024976 A1* | 1/2008 | Hardson | A44B 11/001 | 361/679.42 |
| 2008/0259552 A1* | 10/2008 | Calvarese | G06F 1/163 | 361/679.32 |
| 2010/0267250 A1* | 10/2010 | Schiff | H01R 13/6205 | 439/39 |
| 2012/0081852 A1* | 4/2012 | Maravilla | A45F 5/00 | 361/679.03 |
| 2012/0168471 A1* | 7/2012 | Wilson | A45F 5/00 | 224/152 |
| 2012/0194976 A1* | 8/2012 | Golko | G06F 1/163 | 361/679.01 |
| 2013/0039012 A1* | 2/2013 | Shih | H01L 23/427 | 361/700 |
| 2013/0106603 A1* | 5/2013 | Weast | G06F 1/163 | 340/539.11 |
| 2013/0235546 A1* | 9/2013 | Sedillo | H05K 7/02 | 361/809 |
| 2014/0197946 A1* | 7/2014 | Park | G08B 21/18 | 340/539.11 |
| 2014/0197965 A1* | 7/2014 | Park | G08B 21/18 | 340/870.09 |
| 2014/0239982 A1* | 8/2014 | Alameh | H03K 17/955 | 324/684 |

* cited by examiner

HEAT DISSIPATION STRUCTURE OF INTELLIGENT WEARABLE DEVICE

BACKGROUND OF THE INVENTION

1. Field of the Invention

The present invention relates generally to a heat dissipation structure of intelligent wearable device, which is able to dissipate the heat generated by the intelligent wearable device.

2. Description of the Related Art

Along with the rapid advance of sciences and technologies, various multifunction mobile devices have been developed, including mobile phones, tablets and even intelligent wearable devices such as watches, necklaces and fingerings. The intelligent wearable device is equipped with various electronic components in accordance with the requirements of users, such as touch screen, satellite positioning chip, motion sensor and medical monitoring system. The intelligent watch is connectable to other mobile devices via Bluetooth or network. Moreover, a SIN card can be inserted into the intelligent watch to access to 3G or 4G network and make phone calls or take pictures and film. In operation, the intelligent watch will generate heat. In addition, the entire intelligent watch is designed with a sealed structure for achieving dustproof and waterproof effect and protection function. Under such circumstance, the heat generated by the electronic components in the intelligent watch can be hardly dissipated outward. As a result, the heat will accumulate in the interior of the watch or the device to cause deterioration of execution efficiency of the intelligent watch or even shutdown of the intelligent watch. Furthermore, the conventional heat dissipation component such as heat pipe or vapor chamber cannot be bent so that it is impossible to extend the heat pipe or vapor chamber into the watchband. Therefore, the conventional heat dissipation component is inapplicable to the intelligent watch for dissipating the heat. Accordingly, it has become a critical issue how to solve the heat dissipation problem of the intelligent watch and various intelligent wearable devices.

SUMMARY OF THE INVENTION

It is therefore a primary object of the present invention to provide a heat dissipation structure of intelligent wearable device, which is able to dissipate the heat generated by the intelligent wearable device and solve the heat accumulation problem of the intelligent wearable device.

To achieve the above and other objects, the heat dissipation structure of intelligent wearable device includes a wearable mobile device main body and a hard wearable body. The wearable mobile device main body has a receiving space for receiving therein multiple electronic components. The electronic components have at least one heat source. The hard wearable body is made of thermosetting polymer material or thermoplastic polymer material. The hard wearable body has a chamber having a capillary structure. A working fluid is contained in the chamber. The hard wearable body has a heat absorption section and a heat dissipation section. The heat dissipation section extends from at least one end of the heat absorption section or two ends of the heat absorption section. The hard wearable body is connected with the wearable mobile device main body. The heat absorption section is in contact with the electronic components or the heat source to conduct heat to the heat dissipation section to dissipate the heat at a remote end. Accordingly, the heat dissipation efficiency of the intelligent wearable device is greatly enhanced.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
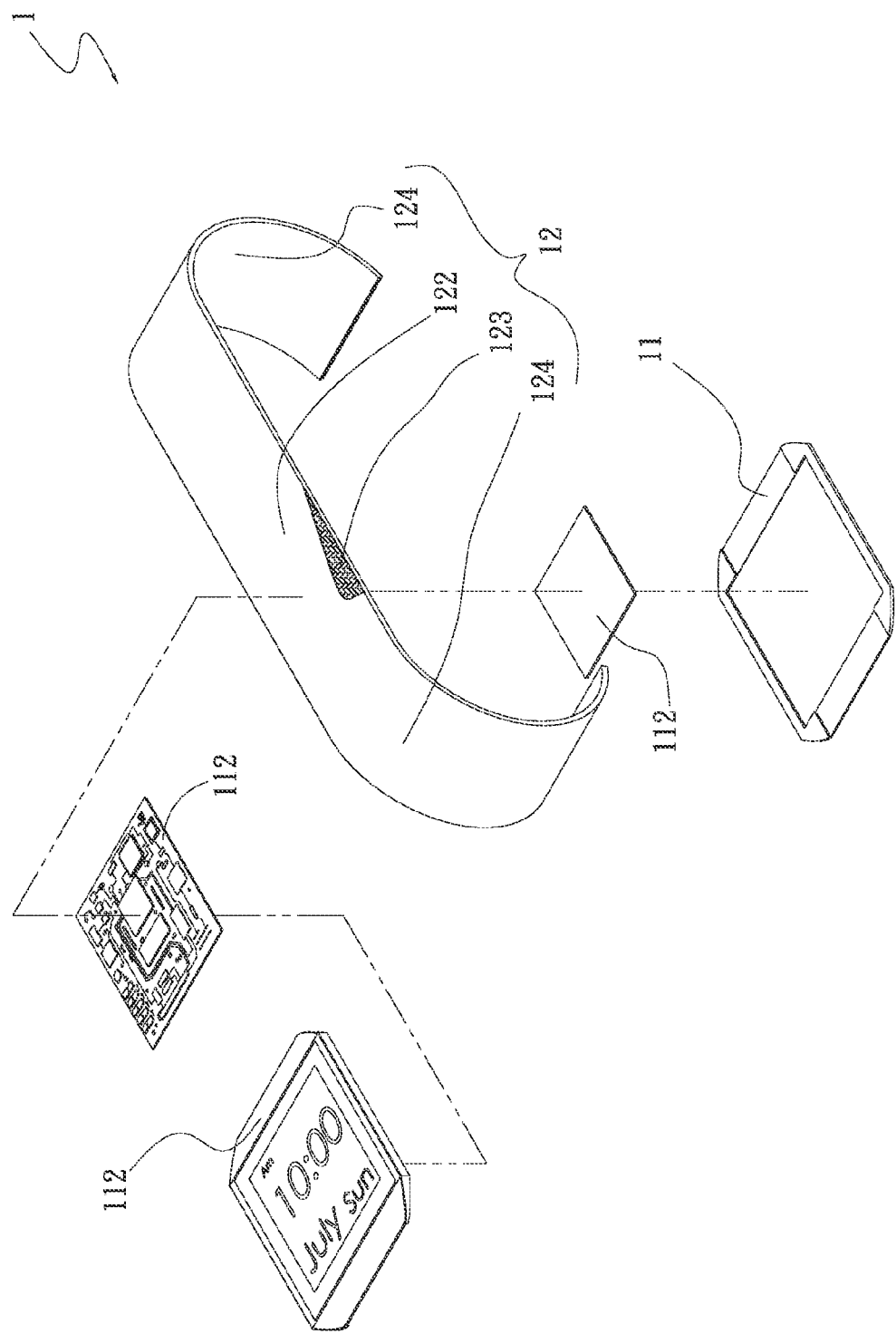
FIG. 1 is a perspective exploded view of a first embodiment of the heat dissipation structure of intelligent wearable device of the present invention.
Figure 2:
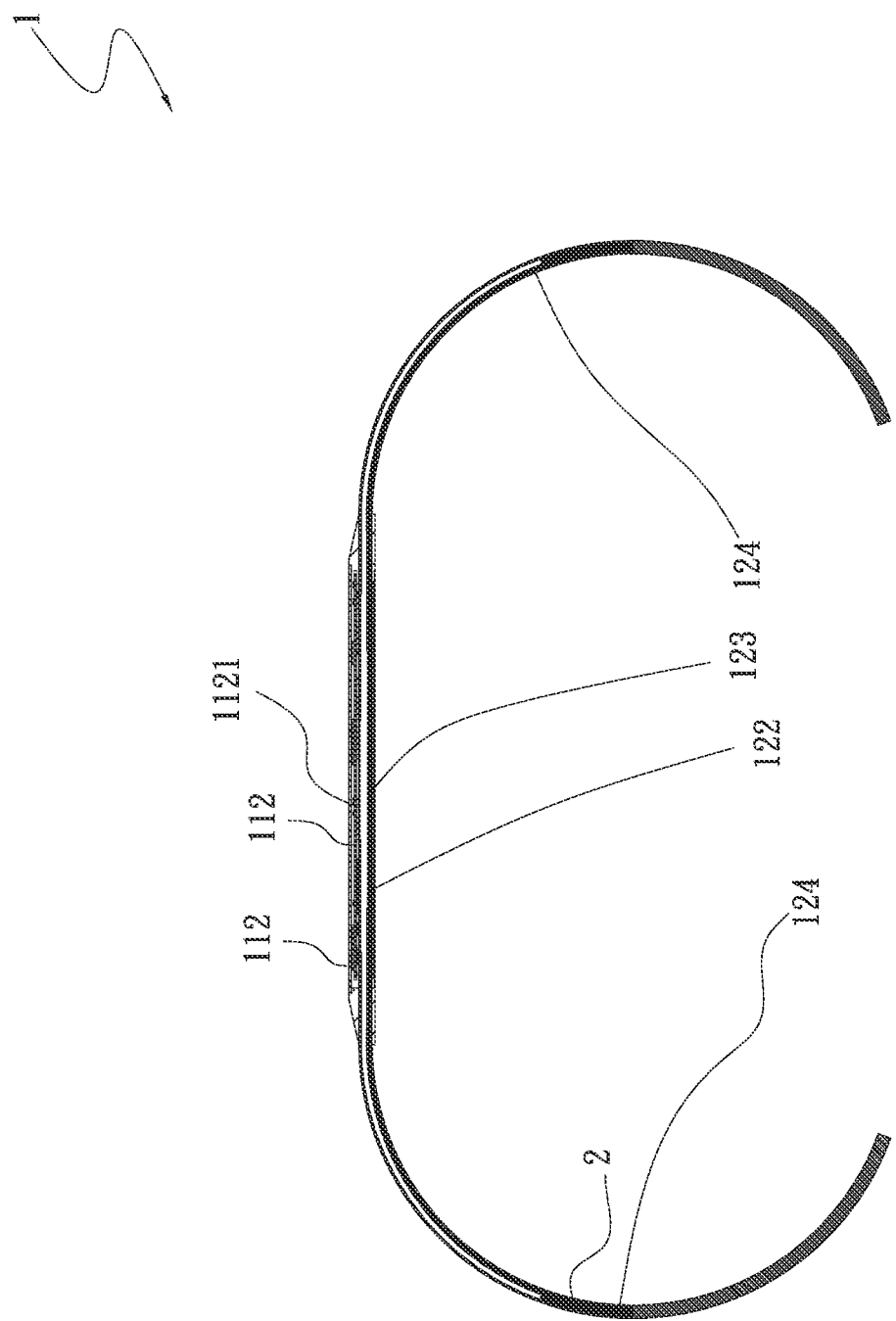
FIG. 2 is a sectional assembled view of the first embodiment of the heat dissipation structure of intelligent wearable device of the present invention.
Figure 3:
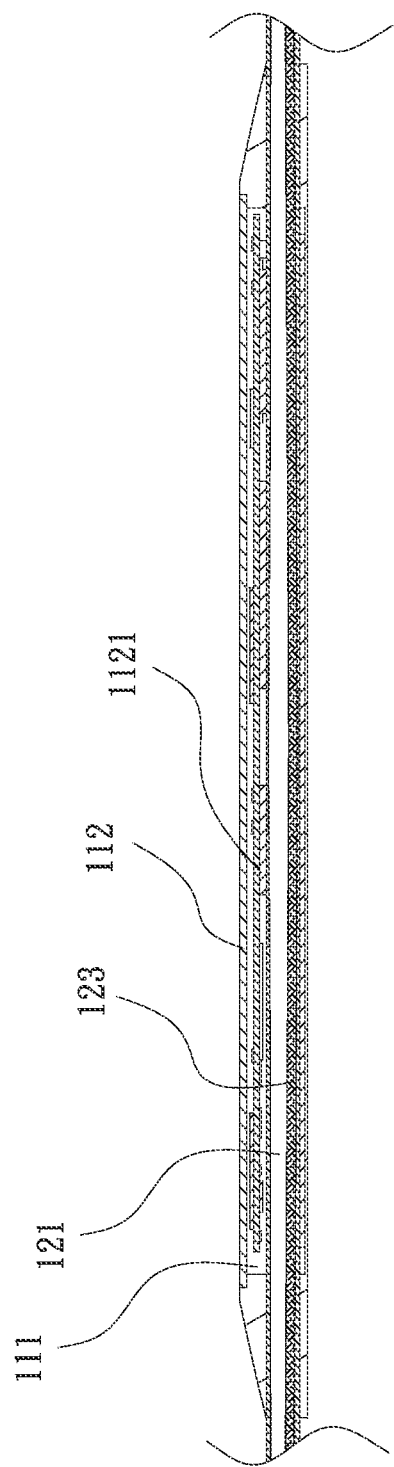
FIG. 3 is an enlarged view of a part of FIG. 2.

Please refer to FIGS. 1, 2 and 3. FIG. 1 is a perspective exploded view of a first embodiment of the heat dissipation structure of intelligent wearable device of the present invention. FIG. 2 is a sectional assembled view of the first embodiment of the heat dissipation structure of intelligent wearable device of the present invention. FIG. 3 is an enlarged view of a part of FIG. 2. According to the first embodiment, the heat dissipation structure 1 of intelligent wearable device of the present invention includes a wearable mobile device main body 11 and a hard wearable body 12.

The wearable mobile device main body 11 has a receiving space 111 for receiving therein multiple electronic components 112. The electronic components 112 has at least one heat source 1121.

The hard wearable body 12 is made of thermosetting polymer material or thermoplastic polymer material. The hard wearable body 12 has a chamber 121 having a capillary structure 123. A working fluid 2 is contained in the chamber 121.

The hard wearable body 12 has a heat absorption section 122 and at least one heat dissipation section 124. The heat dissipation section 124 extends from at least one end of the heat absorption section 122 or two ends of the heat absorption section 122. The hard wearable body 12 is connected with the wearable mobile device main body 11.

The heat absorption section 122 is in contact with the electronic components 112 or the heat source 1121 to conduct heat.

The thickness of the heat absorption section 122 of the hard wearable body 12 is thinner than the thickness of other parts of the hard wearable body 12. The heat absorption section 122 partially directly contacts the electronic components 112 or the heat source 1121.

In the first embodiment, the chamber 121 is formed in the hard wearable body 12 for vapor-liquid circulation of the working fluid 2. The heat absorption section 122 serves to absorb the heat generated by the electronic components 112 or the heat source 1121 in the wearable mobile device main body 11 and conduct the heat to the working fluid 2 in the chamber 121 at the heat absorption section 122 for heat exchange. After heated, the working fluid 2 in the chamber 121 is evaporated to spread within the chamber 121. The working fluid 2 in the chamber 121 at the heat dissipation section 124 is cooled and condensed into liquid working fluid 2. The liquid working fluid 2 flows back to the heat absorption section 122 under the capillary attraction of the capillary structure 123 disposed in the chamber 121 for next vapor-liquid circulation. Accordingly, the heat can be transferred to a remote end for dissipating the heat without accumulation.

Figure 4:
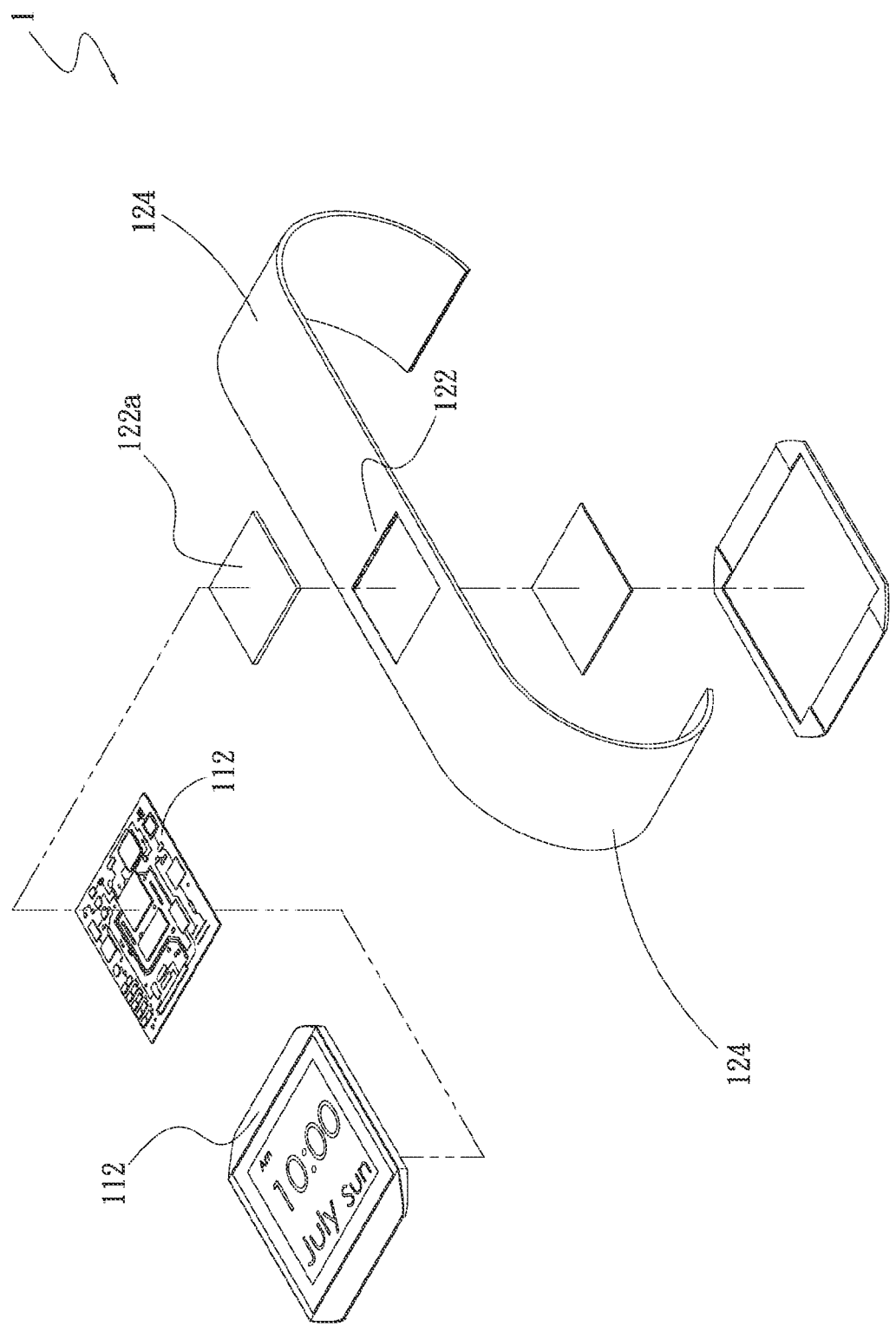
FIG. 4 is a perspective exploded view of a second embodiment of the heat dissipation structure of intelligent wearable device of the present invention.
Figure 5:
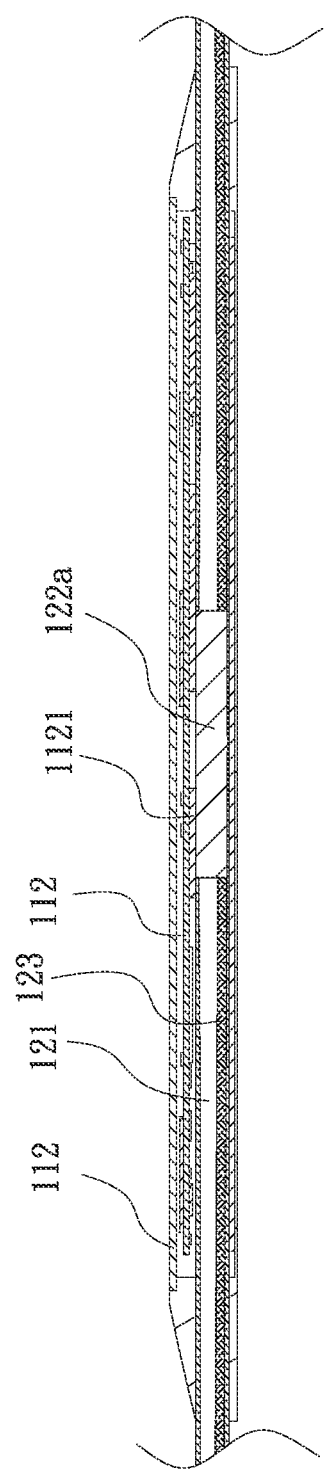
FIG. 5 is a sectional assembled view of a part of the second embodiment of the heat dissipation structure of intelligent wearable device of the present invention.

Please now refer to FIGS. 4 and 5. FIG. 4 is a perspective exploded view of a second embodiment of the heat dissipation structure of intelligent wearable device of the present invention. FIG. 5 is a sectional assembled view of a part of the second embodiment of the heat dissipation structure of intelligent wearable device of the present invention. The second embodiment is partially identical to the first embodiment in structure and thus will not be repeatedly described hereinafter. The second embodiment is different from the first embodiment in that a good heat conductor 122a is inlaid in the heat absorption section 122. One face of the good heat conductor 122a is attached to the electronic components 112 or the heat source 1121. The other face of the good heat conductor 122a faces the chamber 121 of the hard wearable body 12.

In this embodiment, a part of the good heat conductor 122a is exposed to outer side of the chamber 121 of the hard wearable body 12. The part of the good heat conductor 122a is in direct contact with the electronic components 112 or the heat source 1121 in the wearable mobile device main body 11 to conduct the heat. A part of the good heat conductor 122a is positioned in the chamber 121 to transfer the heat to the working fluid 2 in the chamber 121. The working fluid 2 is heated and evaporated to spread within the chamber 121. The working fluid 2 in the chamber 121 at the heat dissipation section 124 is cooled and condensed into liquid working fluid 2. The liquid working fluid 2 flows back to the good heat conductor 122a under the capillary attraction of the capillary structure 123 for next vapor-liquid circulation. Accordingly, the heat can be transferred to a remote end for dissipating the heat without accumulation. Therefore, the heat dissipation efficiency of the entire wearable mobile device main body 11 is enhanced.

Figure 6:
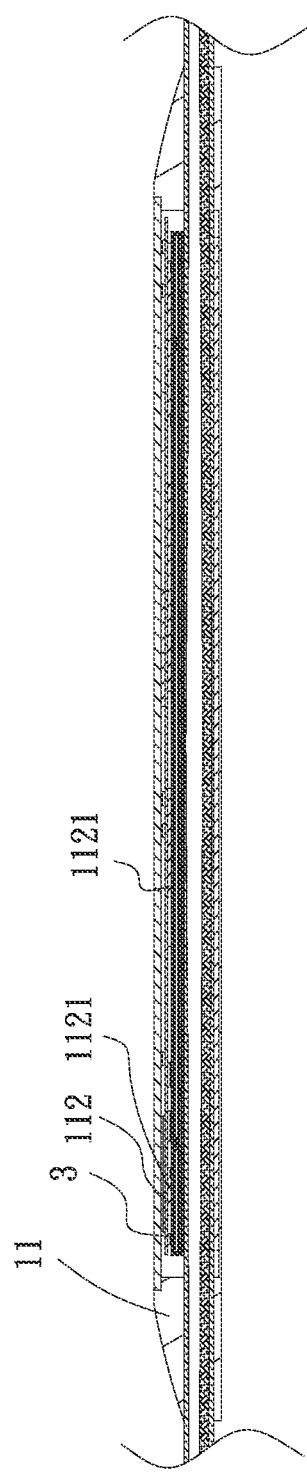
FIG. 6 is a sectional assembled view of a third embodiment of the heat dissipation structure of intelligent wearable device of the present invention.

Please now refer to FIG. 6, which is a sectional assembled view of a third embodiment of the heat dissipation structure of intelligent wearable device of the present invention. The third embodiment is partially identical to the first embodiment in structure and thus will not be repeatedly described hereinafter. The third embodiment is different from the first embodiment in that the third embodiment further includes a heat conduction member 3. The heat conduction member 3 is selected from a group consisting of a heat pipe, a vapor chamber, a graphite sheet and a metal member. In this embodiment, the heat conduction member 3 is, but not limited to, a vapor chamber for illustration purposes only. The vapor chamber is a large-area heat conduction member for face-to-face heat conduction. The vapor chamber is in contact with at least one heat source 1121 or multiple heat sources 1121 to collectively absorb the heat generated by the heat sources 1121. Then, the vapor chamber further conducts the heat to the heat absorption section 122 and heat dissipation section 124 of the hard wearable body 12 (as shown in FIG. 1). The working fluid 2 is evaporated and condensed to dissipate the heat. Accordingly, the heat dissipation efficiency of the entire wearable mobile device main body 11 is enhanced.

Figure 7:
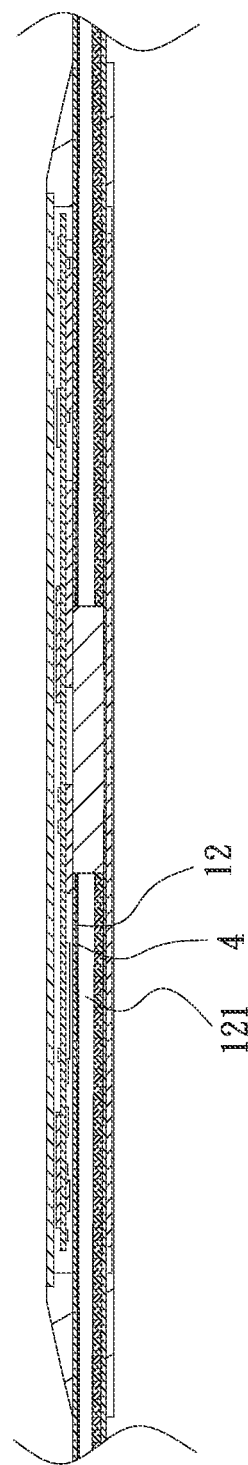
FIG. 7 is a sectional assembled view of a fourth embodiment of the heat dissipation structure of intelligent wearable device of the present invention.

Please now refer to FIG. 7, which is a sectional assembled view of a fourth embodiment of the heat dissipation structure of intelligent wearable device of the present invention. The fourth embodiment is partially identical to the first embodiment in structure and thus will not be repeatedly described hereinafter. The fourth embodiment is different from the first embodiment in that the fourth embodiment further includes a coating 4 coated on a wall face of the chamber 121 of the hard wearable body 12.

The capillary structure 123 of the first to fourth embodiments is selected from a group consisting of mesh body, fiber body, metal wire braided body and sintered powder body. The electronic component 112 is selected from a group consisting of touch screen, circuit board, transistor, CPU, MCU, GPU, RAM and battery.

The present invention has been described with the above embodiments thereof and it is understood that many changes and modifications in the above embodiments can be carried out without departing from the scope and the spirit of the invention that is intended to be limited only by the appended claims.

What is claimed is:

1. A heat dissipation structure of intelligent wearable device, comprising:
   a wearable mobile device main body having a receiving space for receiving therein multiple electronic components, the electronic components having at least one heat source; and
   a hard wearable body made of thermosetting polymer material or thermoplastic polymer material and being a heat conducting structure for directly contacting with the wearable mobile device main body to conduct heat, the hard wearable body having a chamber having a capillary structure, a working fluid being contained in the chamber, the hard wearable body having a heat absorption section and at least one heat dissipation section, the heat dissipation section extending from at least one end of the heat absorption section or two ends of the heat absorption section, the hard wearable body being connected with the wearable mobile device main body, wherein the heat absorption section is at least partially in direct contact with the electronic components or the heat source to conduct heat.

2. The heat dissipation structure of intelligent wearable device as claimed in claim 1, wherein the capillary structure is selected from a group consisting of mesh body, fiber body, metal wire braided body and sintered powder body.

3. The heat dissipation structure of intelligent wearable device as claimed in claim 1, wherein the electronic component is selected from a group consisting of circuit board, transistor, CPU, MCU, GPU, RAM and battery.

4. The heat dissipation structure of intelligent wearable device as claimed in claim 1, wherein a coating is coated on a wall face of the chamber of the hard wearable body.

5. The heat dissipation structure of intelligent wearable device as claimed in claim 1, wherein a good heat conductor is inlaid in the heat absorption section, one face of the good heat conductor being attached to the electronic components or the heat source, the other face of the good heat conductor facing the chamber of the hard wearable body, the capillary structure being disposed on a surface of the good heat conductor.

6. The heat dissipation structure of intelligent wearable device as claimed in claim 1, wherein the heat absorption section of the hard wearable body has a thickness thinner than a thickness of other parts of the hard wearable body, the heat absorption section partially contacting the electronic components or the heat source.

7. The heat dissipation structure of intelligent wearable device as claimed in claim 1, further comprising a heat conduction member, the heat conduction member being selected from a group consisting of a heat pipe, a vapor chamber, a graphite sheet and a metal member.

* * * * *